June 23, 1925.
E. H. HANEY
LUBRICATING SYSTEM
Filed Aug. 11, 1922
1,542,875
2 Sheets-Sheet 1
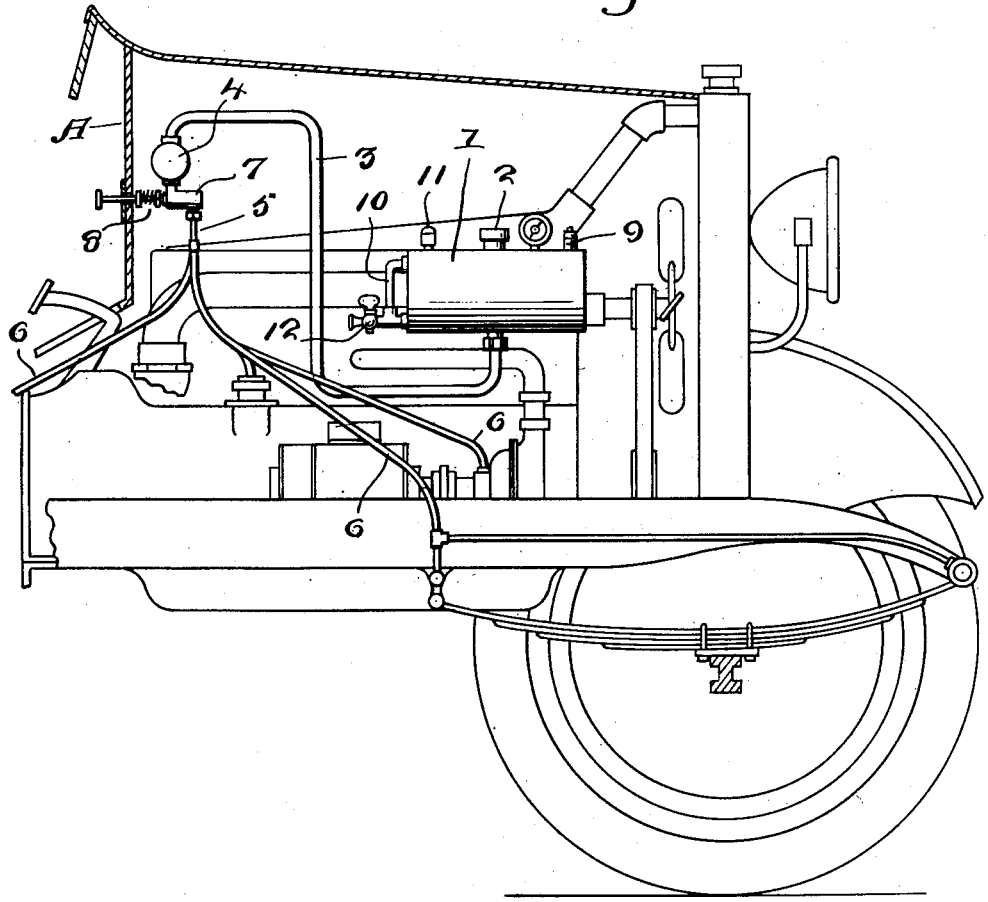
Fig. 1.
Fig. 5.
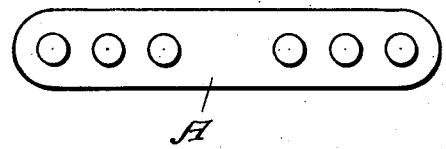
WITNESS:
E. H. Haney
INVENTOR
BY Victor J. Evans
ATTORNEY June 23, 1925.  1,542,875
E. H. HANEY
LUBRICATING SYSTEM
Filed Aug. 11, 1922   2 Sheets-Sheet 2
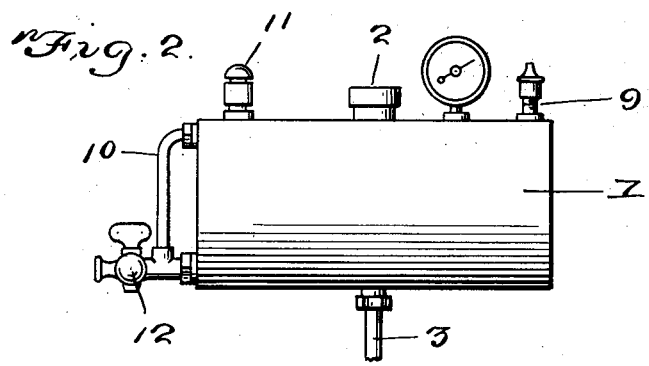
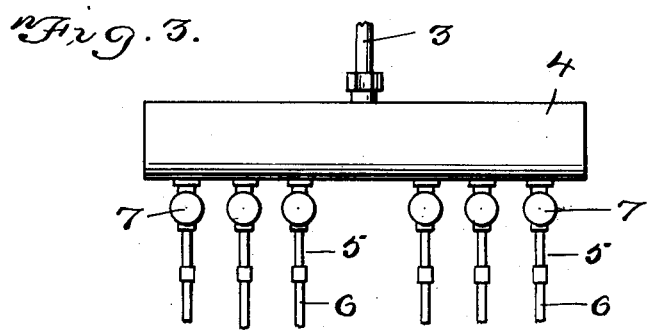
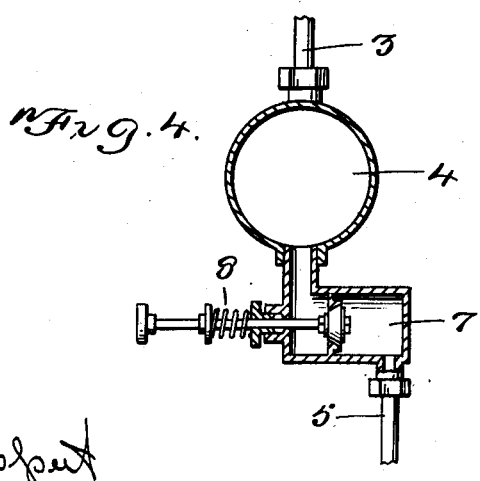

Patented June 23, 1925.

1,542,875

UNITED STATES PATENT OFFICE.

EDWIN HORACE HANEY, OF DENVER, COLORADO, ASSIGNOR OF ONE-EIGHTH TO J. B. BANEY, OF DENVER, COLORADO.

LUBRICATING SYSTEM.

Application filed August 11, 1922. Serial No. 581,217.

*To all whom it may concern:*

Be it known that I, EDWIN HORACE HANEY, a citizen of the United States, residing at Denver, in the county of Denver and State of Colorado, have invented new and useful Improvements in Lubricating Systems, of which the following is a specification.

This invention relates to a lubricating system for motor vehicles and other machinery, the general object of the invention being to provide pressure means for forcing lubricant to the different parts to be lubricated from a certain point. This invention is an improvement over that granted to me on Oct. 9, 1923, No. 1,470,165.

Another object of the invention is to provide controlling means at one point in the system for controlling the flow of lubricant to the various points.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a diagrammatic view showing the invention in use upon a motor vehicle.

The remaining figures are detail views.

In these views 1 indicates a tank which is adapted to be supported in any suitable place. This tank is adapted to be filled with lubricant through the filling opening 2 and it is connected by a pipe 3 with a distributor cylinder 4. Tubes 5 lead from the cylinder 4 to the various parts to be lubricated, these tubes being connected with the inlet ports of such parts by the flexible tubes 6. Valves 7 are provided for controlling the flow of lubricant from the cylinder 4 into the tubes 5, these valves being normally held closed by the springs 8. The handles of these valves extend through the dash A of the vehicle so that they can be easily reached by a person in the driver's seat. These valve handles are associated with indicating means for telling when the valves are in open or closed condition. The tank 1 is provided with an air valve 9 whereby compressed air can be forced into the tank by a pump or the like to place the lubricant therein under pressure. It is also provided with a sight gage 10, a safety valve 11 and a drain cock 12.

From the above it will be seen that the entire vehicle can be lubricated without the driver leaving the seat as all he has to do is to open the valves to supply lubricant to the different parts. The air pressure will insure the lubricant reaching the different parts.

While I have shown the invention as associated with a motor vehicle it will of course be understood that it can be used with any kind of machinery to be lubricated.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A lubricating system comprising a supply tank, a distributor tank connected therewith from which lubricant is distributed by fluid pressure, a plurality of valve casings connected with the distributor tank, a spring pressed valve in each casing and normally closing the same, a handle connected with each of the valves for permitting them to be moved to opened position, a flexible tube connecting each of the valve casings with a part to be lubricated and means on the supply tank for permitting an air pump to be attached thereto so that compressed air can be pumped into the tank to place the lubricant therein under pressure.

In testimony whereof I affix my signature.

EDWIN HORACE HANEY.